Figure 1:
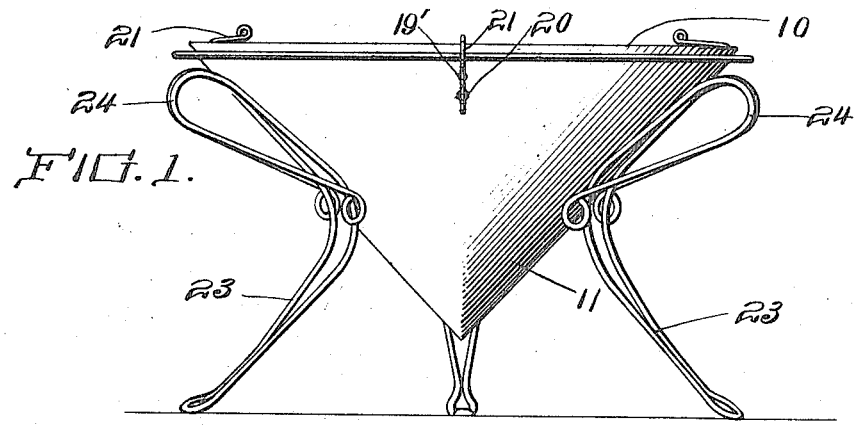

T. HANLON.
CUSPIDOR.
APPLICATION FILED MAY 26, 1916.

1,196,681. Patented Aug. 29, 1916.
2 SHEETS—SHEET 1.

Witnesses

Inventor
Timothy Hanlon
By Victor J. Evans
Attorney

T. HANLON.
CUSPIDOR.
APPLICATION FILED MAY 26, 1916.
1,196,681.
Patented Aug. 29, 1916.
2 SHEETS—SHEET 2.
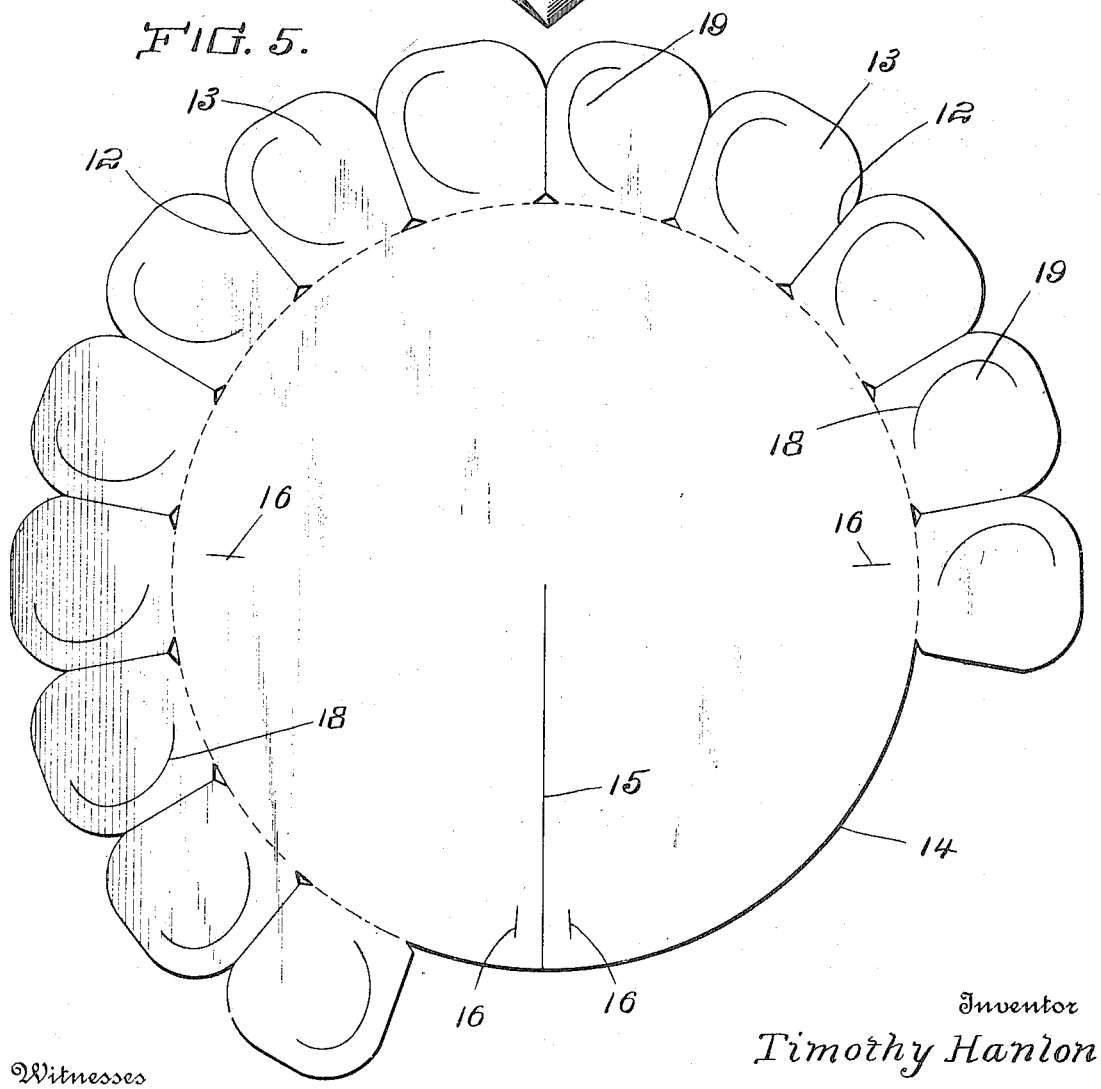
Witnesses
A. C. Newkirk
Edward Gogel
Inventor
Timothy Hanlon
By Victor J. Evans
Attorney

UNITED STATES PATENT OFFICE.

TIMOTHY HANLON, OF WILMINGTON, ILLINOIS.

CUSPIDOR.

1,196,681.   Specification of Letters Patent.   Patented Aug. 29, 1916.

Application filed May 26, 1916. Serial No. 100,111.

*To all whom it may concern:*

Be it known that I, TIMOTHY HANLON, a citizen of the United States, residing at Wilmington, in the county of Will and State of Illinois, have invented new and useful Improvements in Cuspidors, of which the following is a specification.

This invention contemplates the provision of a cuspidor wherein use is made of a paper receptacle and a support therefor, the receptacle being adapted to receive the spittle and designed to prevent spilling of its contents should the device be casually tilted.

The invention further embodies means for holding the receptacle associated with its support, yet permitting of a quick and ready separation of these parts when it is desired to change the receptacle, it being the intention to throw the used receptacle away thereby eliminating the necessity of cleaning devices of this character.

In carrying out my invention I provide the support for the receptacle with legs formed to provide handles conveniently disposed with respect to the support, whereby the device in its entirety can be easily lifted and carried from place to place when desired.

The nature and advantages of the invention will be better understood from the following description when read in connection with the accompanying drawings, the invention residing in the construction, combination and arrangement of parts as claimed.

In the drawings forming part of this specification like numerals of reference indicate similar parts in the several views and wherein:—

Figure 2:
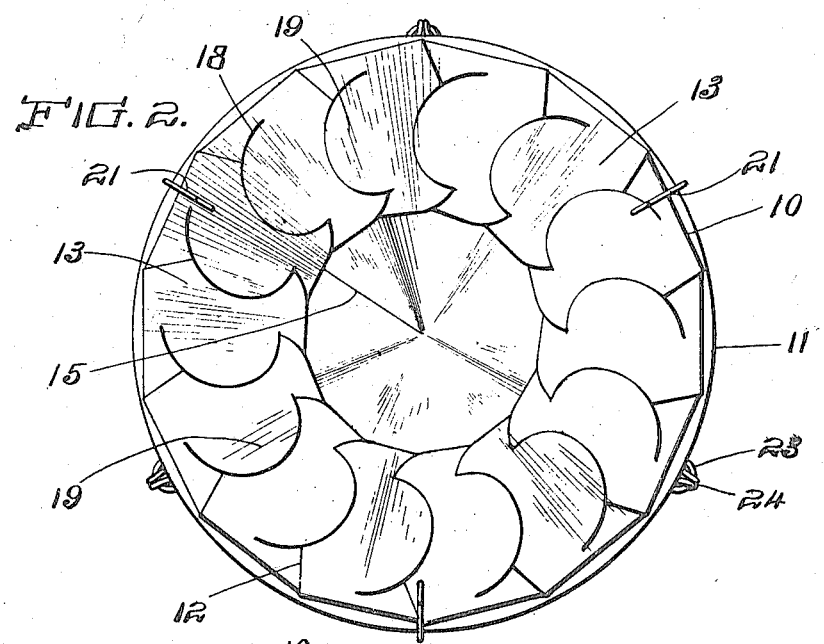
Figure 3:
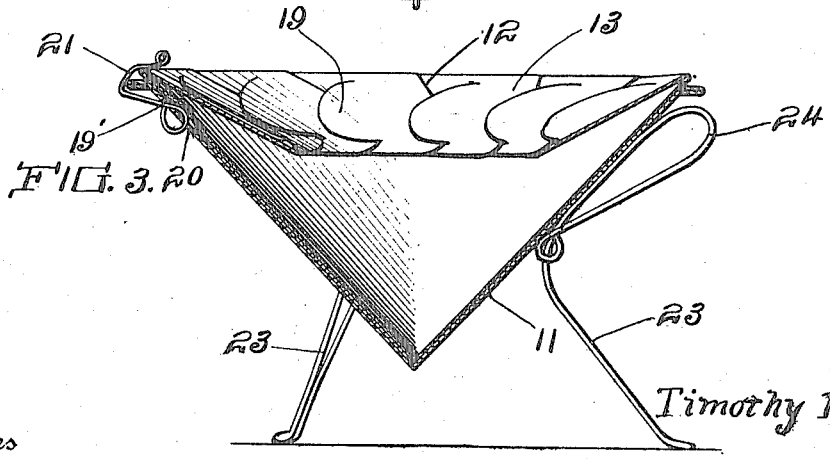

Figure 1 is a view in elevation of the device constructed in accordance with my invention. Fig. 2 is a top plan view. Fig. 3 is a vertical transverse sectional view. Fig. 4 is a view of the receptacle removed from its support. Fig. 5 is a plan view of the blank from which the receptacle is formed.

Referring more particularly to the drawings in detail 10 indicates generally the receptacle constituting the cuspidor proper, and 11 the support therefor. The receptacle may be of any desired contour, but as shown in this particular instance is frusto-conical shape, being constructed from a substantially disk-like piece of paper or other suitable material, and which is preferably moisture and fire-proof. The material is slit at spaced intervals as at 12 thereby providing a plurality of separated portions 13, the purpose of which will be hereinafter described. These separated portions extend approximately three-fourths of the distance about the circumference, while the surplus material is cut away as at 14. The disk proper is cut as at 15 from its center radially to the periphery a point intermediate the two end portions 13, which permits of the disk being struck up from the center into frusto-conical formation. The edges of the disk defined by the slit 15 are disposed in overlapping relation, each being provided with a slot 16 to receive one terminal of a bendable strip of material 17, constituting clips to hold the material in frusto-conical formation, two of such clips being employed and secured to the body portion of the disk at diametrically opposite points as illustrated. Each of the separated portions 13 is cut as at 18 to provide tongues 19 for interlocking engagement with the adjacent separated portion 13, which separated portions unitedly define a flange adapted to be folded from its point of juncture with the body of the disk inwardly and downwardly within the frusto-conical shaped receptacle, but spaced from the inner surface thereof, to prevent spilling of the contents of the receptacle should the device in its entirety be casually tilted as will be readily understood.

In connection with a receptacle of this character I employ a support embodying a body portion of a configuration to conform to the particular shape of the receptacle 10, and which as shown in this instance is of frusto-conical formation. The support 11 may be constructed from any suitable material preferably light metal, and is of a capacity to wholly receive the receptacle 10 whereby the edges of the receptacle and support will lie substantially flush when the parts are associated. The body portion of the support is provided at intervals with spaced pairs of openings 19' and 20 respectively, which openings are arranged in superimposed relation adjacent the upper edge of the support. Passed through said openings is one end of securing elements 21, which latter are preferably constructed from a single length of wire having said end looped through said openings to permit said members to have a pivotal movement vertically, while the opposite ends of said elements terminate to provide a hook adapted to embrace the edges of the receptacle 10 and support 11 to hold these parts associated. But by reason of the pivotal connection between the support 11 and the securing elements, it is manifest that the latter may be quickly and easily disengaged from the receptacle 10 to allow the latter to be easily removed from its support when desired, and which with its contents is intended to be thrown away, or destroyed, with a view of eliminating the necessity of cleaning devices of this character.

Secured to the body 11 of the support is a plurality of supporting legs indicated generally at 23, and which legs may be constructed from any suitable material. As shown in this instance these legs are formed from a single length of wire, each leg being formed to provide a handle loop 24 disposed at an angle with respect to the leg proper immediately beneath the upper edge of the support, whereby the device in its entirety can be conveniently and easily lifted, and carried from place to place as the occasion may require. These combined legs and handles are not only useful for the purposes mentioned, but greatly add to the ornamentality and general appearance of the device as a whole.

While it is believed that from the foregoing description the nature and advantages of the invention will be readily apparent, I desire to have it understood that such changes in the general make-up of the invention, as fall within the scope of what is claimed, may be resorted to when desired without departing from the spirit of the invention.

What is claimed is:—

1. A cuspidor constructed from a single blank of moisture-proof material, split transversely along its edge to provide a plurality of separated portions, said portions being connected together and unitedly defining an inwardly and downwardly directed flange spaced from the body of the receptacle, a support for the latter, and means for holding the receptacle detachably associated with the support.

2. A cuspidor constructed from a single blank of material into frusto-conical shape, said material being slit at spaced intervals from its marginal edge to provide a plurality of separated portions, each of said portions including a tongue for interlocking engagement with the adjacent portion, whereby said portions unitedly define an inwardly and downwardly directed flange, and a support for the receptacle.

In testimony whereof I affix my signature.

TIMOTHY HANLON.

Witnesses to signature:
 GEO. F. BELL,
 WM. SHEAR.